United States Patent [19]

Janicki et al.

[11] 4,394,609

[45] Jul. 19, 1983

[54] CONTROL PROVISION OPERATION FOR PRINTING MACHINES

[75] Inventors: Max Janicki; Hans-Georg Liefke; Reinhart Keil; Gerd Geyer, all of Leipzig, German Democratic Rep.

[73] Assignee: Veb Kombinat Polygraph "Werner Lamberz", Leipzig, German Democratic Rep.

[21] Appl. No.: 250,703

[22] Filed: Apr. 3, 1981

[30] Foreign Application Priority Data

Apr. 10, 1980 [DD] German Democratic Rep. .... 220348

[51] Int. Cl.³ .............................................. G05B 19/28

[52] U.S. Cl. .................................... 318/603; 318/640

[58] Field of Search ........................ 318/664, 640, 603

[56] References Cited

U.S. PATENT DOCUMENTS 4,131,840 12/1978 Wiesner ......................... 318/664 X 4,184,107 1/1980 Turini et al. .................... 318/640 X 4,187,456 2/1980 von der Heide ................ 318/640 X 4,291,262 9/1981 Nakajima ....................... 318/664 X

*Primary Examiner*—B. Dobeck

*Attorney, Agent, or Firm*—Michael J. Striker

[57] ABSTRACT

A control and monitoring provision for final control elements such as inking and dampening fountain keys or metering screws at printing machines. A displacement pickup disk is solidly connected to the movable part of the final control element together with sensing means having two sensing elements. The output of the sensing elements is fed to a circuit for recognizing the direction of rotation of the final control element and to an electronic counting device with optical display. In a following comparison circuit the preset set point values are compared with the actual values and the comparison circuit is followed by a circuit for reversing the direction of rotation of the motor and for opening of a gate having its inputs connected as desired with a preset set point device and a data carrier and the output of the gate is connected to a monitor provision and by way of a following amplifier to the final control element.

13 Claims, 2 Drawing Figures

CONTROL PROVISION OPERATION FOR PRINTING MACHINES

DESCRIPTION

BACKGROUND OF THE INVENTION

1. Field of the Invention

The present invention relates to a provision for controlling and supervising of final control elements such as for example inking and dampening set screws or fountain keys at printing machines.

2. Brief Description of the Background of the Invention Including Prior Art

A device for adjusting of ink metering elements in ink ducts of printing machines is known from German Auslegeschrift DE-AS No. 2,714,577, where the position of the ink metering elements can be determined by displacement pickup and where the position can be remotely adjusted by control drives and where electronic storage elements following to the displacement pickups store the individual positions of the ink metering elements by way of tapped voltage values. The output signal of the storage is compared with the output signal of the displacement pickup in a comparison circuit and upon deviation from each other the drive of the final control element is actuated. The control device however shows oscillatory behavior during the comparing process depending on the size of the amplification of the measured values. The reason for this is the construction of this setting device by way of an analog automatic control system. Until the final state is reached by the final control elements the oscillatory behavior of the final control elements around their final value effects production of spoilage and maculature and irregularities in the proportioning of the dampening and inking fluids.

SUMMARY OF THE INVENTION

Purposes of the Invention

It is an object of the present invention to determine the position of the final control elements in such a way that a digital pickup and processing of the measured values is possible in a control circuit for adjusting the final control elements.

It is another object of the present invention to disclose a provision for controlling and supervising final control elements at printing machines operating at levels of increased accuracy.

It is a further object of the invention to provide a logic circuit and a motor control circuit for reliable and nonoscillatory control of final control elements in printing machines.

These and other objects and advantages of the present invention will become evident from the description which follows.

BRIEF DESCRIPTION OF THE INVENTION

The present invention provides a control provision for final control elements such as employed for example in printing machines, which comprises a rotary final control element driven by a motor, a disk with recesses attached to the rotary final control element where the recesses are regularly spaced from the axis, sensing means having two sensing points disposed at a radial distance from the axis suitable for engaging the recesses of the disks, a circuit connected to the sensing means for recognizing the rotary direction of the final control element, an electronic counter connected to the circuit for recognizing the direction of rotation, a comparison circuit connected to the electronic counter and to the set value provision for comparing the actual and the preset setting values, a device for reversal of direction of rotation connected to the comparison circuit and to the circuit for recognizing rotary direction, a gate connected to the preset value provision and to the device for reversal of rotation, and a motor control circuit connected to the motor and to the gate.

Preferably, the control provision comprises an optical display connected to the electronic counter and featuring as display elements light emitting diodes. The motor circuit can comprise an amplifier connected to the gate and to the motor, a motor control electronic connected in series to the motor and to the amplifier and a power source connected in series to the motor, the amplifier and to the motor control electronic. The amplifier can comprise a relay. The set value provision can be provided for example by a punched tape reader, by a manually controlled device or by an electronically controlled device. The recesses can be recessed areas in the outer circumference of the disc, they can be teeth of or holes in the disc. The recesses can have equal radial distance and the distance between neighboring recesses can be about the same in each case. The gate can comprise a bistable multivibrator. The sensing means can be at each point a photodiode and a light emitting diode or other source of radiation.

The motor control circuit can also comprise a power source connected in series with the motor, a relay connected in series with the motor and with the power source, antiparallel connected nonlinear resistors connected in series with the motor, with the power source and the relay thereby forming a circuit, antiparallel connected optoelectronic couplers connected to the antiparallel connected nonlinear resistors, an amplifier connected to the antiparallel connected couplers, a time function element connected to the amplifier, and a Schmitt-trigger connected to the time function element and to the gate. Preferably, the nonlinear resistors include diodes. In a preferred embodiment a set drive remotely controls the final control element.

There is also provided in the present invention a method for controlling and adjusting final control elements which comprises rotating the final control element together with an axially centered disk having recesses regularly spaced from the axis, sensing the position of the recesses at at least two points with sensors, recognizing the direction of rotation by processing signals coming from the sensors, counting with an electronic counter signals provided by the sensors, comparing the results of the counting with values provided by a set value provision to determine the presence of a deviation, providing for reversal of direction of the motor upon appropriate deviation by employing a reversal signal, gating the preset value and the reversal signal for providing a gate signal, and controlling the final control element by employing the gate signal. Preferably the results of the counting are displayed by means such as light emitting diodes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying claims.

BRIEF DESCRIPTION OF THE DRAWING

In the accompanying drawing in which are shown two of the various possible embodiments of the invention.

DESCRIPTION OF INVENTION AND PREFERRED EMBODIMENTS

Figure 1:
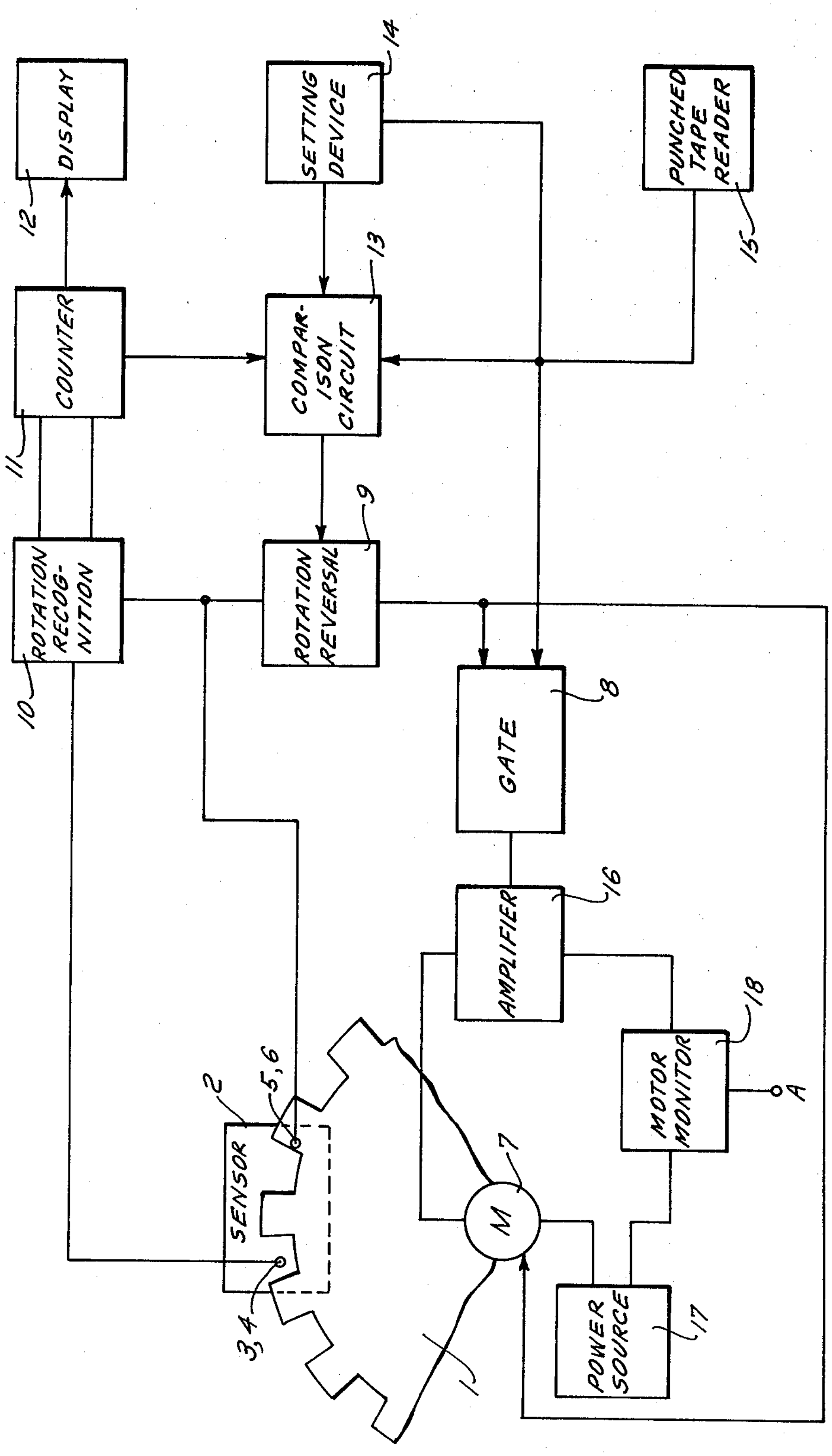
FIG. 1 is a schematic view of the disk and the circuit blocks.

In accordance with the present invention, the test disk for recognition of the position of final control elements is solidly connected to the movable part of the final control elements and is provided with a sensing means comprising two sensing points and the sensing means is followed by a circuit for recognizing the direction of rotation of the final control elements and this in turn is followed by an electronic counter connected to an optical display unit. A preselection provision is followed by a comparison circuit for comparing the preselected values with the actual setting. The comparison circuit is followed by a provision for reversing the direction of rotation of the motor and for opening of a gate, which is connected with its inputs to a set value provision and with a data carrier and the output of the gate is connected to the motor control provision, which is connected to the final control unit by way of a following amplifier. The set value provision can be a punched tape reader, a manual set device or an electronic set device.

Advantageously, the test disk is provided with recesses disposed at uniform distance from the center of rotation and the recesses have about equal distances between two neighboring recesses in each case.

For the determination and adjustment of small steps the sensing means are constructed such that the sensing elements in each case comprise a photodiode and a light emitting diode.

In a possible embodiment the gate comprises a bistable multivibrator. The optical indication is possibly provided by an optical display unit comprising light emitting diodes. It is advantageous in the applications to provide final control elements comprising electric motors. The connection between the output of the bistable multivibrator and the motor is advantageously provided such that the amplifier comprises a relay. When employing a-c motors it is advantageous to connect in series the motor control electronic, the electromotor, a voltage source and a relay where the motor control electronics comprises antiparallel connected nonlinear resistors and where the antiparallel resistors are connected via antiparallel connected optoelectronic couplers to an amplifier and where the amplifier proper is followed by a time function element and by a Schmitt-trigger having its output connected to a gate.

When employing usual devices it is advantageous to use diodes as nonlinear resistors.

The provision for control and monitoring of final control elements at printing machines comprises with the pulse sequence generating disk the position of the final control elements in individual step pulses depending on the form of the pulse generating disk and recognizes the direction of rotation from the pulse sequence of the two sensing elements or respectively by the sequence of the pulse edges and thus allows the counting, display and control of the final control elements. Therewith an oscillatory behavior of the final control elements around their final position is not possible. The accuracy of the setting can be varied by the shape of the measuring disk.

The invention is further illustrated by way of the following embodiments. Referring now to FIG. 1, the position of the motor is sensed via the pulse generating disk 1 and a sensing device 2 with two sensing elements, which in each case comprise a photodiode 3, 5 and a light emitting diode 4, 6. Preferably, the measuring disk is provided with rectangular recesses at its circumference, which recesses are disposed in accordance with the desired step angle and with the thereby required accuracy in certain distances from each other. The pulse generating disk 1 is solidly connected to the rotor of the motor 7.

The sensing means 2 provides upon passing of a setting step via the photodiode 5 and the light emitting diode 6 an electronic pulse in case the pulse generating disk 1 has moved so far that the light barrier is closed by the following tooth of the pulse generating disk. At the same time the light barrier of the photodiode 3 and the light emitting diode 4 is closed by the pulse generating disk. The sensing element with the photodiode 5 and the light emitting diode 6 effects therefor a 0-1 signal and the sensing element of the photodiode 3 and the light emitting diode 4 a 1—signal. After the pulse edge step of the photodiode 5 and the light emitting diode 6 both sensing elements provide a 1—signal. If the pulse generating disk proceeds, then the photodiode 3 and the light emitting diode 4 sense a 1-0 pulse edge step, whereas the photodiode 5 and the light emitting diode 6 continue to provide a 1—signal. If the direction of rotation of the motor is reversed, then the sequence of the pulses or respectively of the pulse edge steps changes such that thereby the direction of rotation can be recognized by the direction of rotation recognizing circuit 10. The output of this pulse sequence is possible by a disposition of the sensing elements at a distance which is larger than the distance from recess to recess, however never equals a full multiple of this distance.

The direction of rotation recognizing circuit 10 comprises as is known a logic circuit for recognizing a certain change in the pulse sequence. After separating the counting pulses into counting pulses of the two directions of rotation of the motor 7 the same are fed to a usually employed electronic bidirectional counter device 11 and are shown on a display 12 comprising light emitting diodes. At the same time the counting pulses of the bidirectional counter device 11 are fed to a pulse comparison circuit 13, wherein the preset setting steps are stored provided by a punched tape reader 15 or by a manual preset device 14. Such comparison circuits are known. As long as the difference between the set point values and the values of the counter 11 remains, the bistable multivibrator 8 is set again and again by a setting signal. This effects that the motor 7 is readjusted until its final position has been reached. A motor monitoring provision 18 is connected between the bistable multivibrator 8 and the motor 7 for monitoring the function of the motor 7 by way of a current flowing in each case for a certain time. An amplifier 16, preferably comprising a relay is connected to the multivibrator 8, to the motor monitoring provision 18 and to the motor 7.

Figure 2:
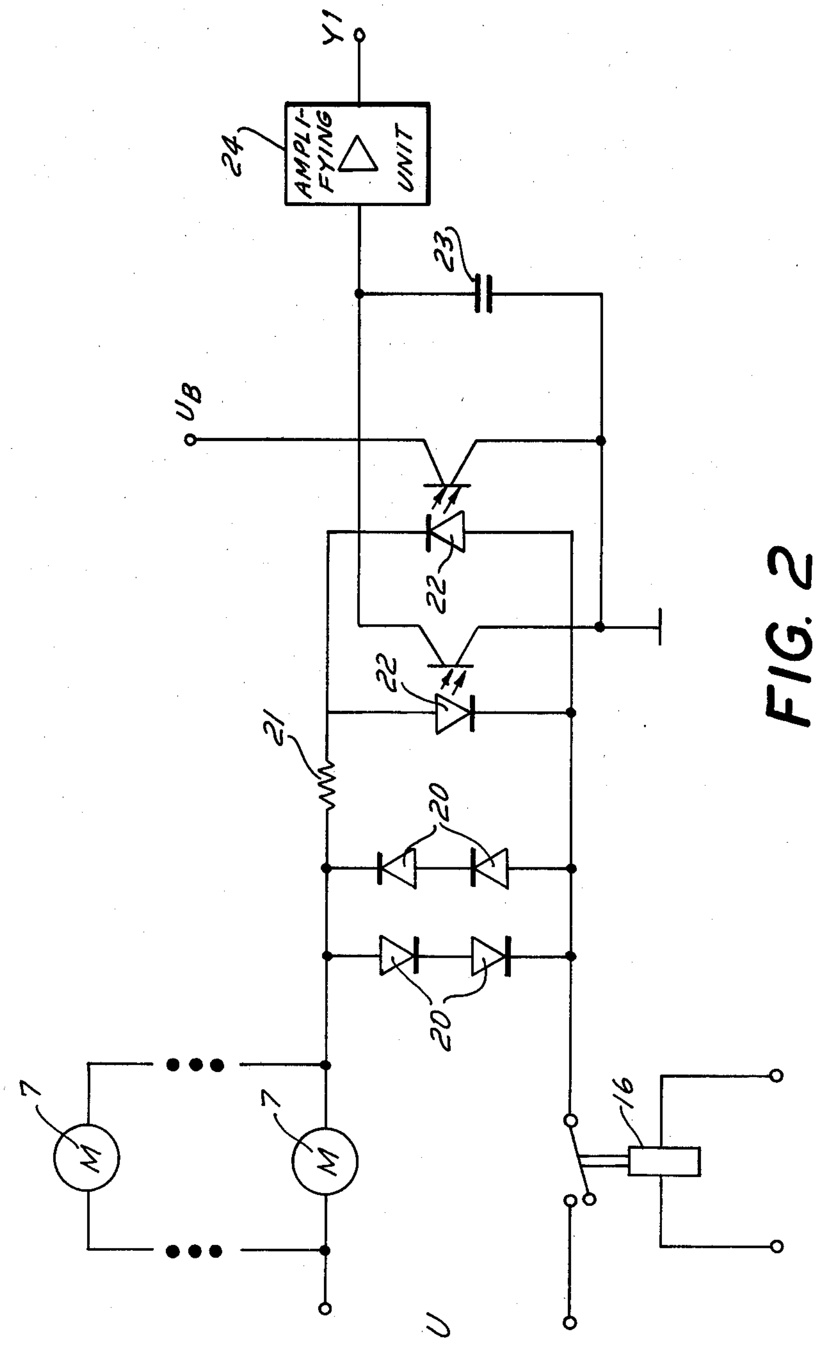
FIG. 2 is a schematic diagram of the control provisions for the motor.

Referring now to FIG. 2 the circuit shown serves to be able to determine a mechanical blocking of the motor 7 that is in case the motor becomes defective, in case the metering screws get stuck or the like. The output signal from the amplifier proper contained in the amplifier unit 24 is connected to a Schmitt-trigger and a time function element having an output $y_1$. This allows to reduce the amount of spoilage and maculature generated and damage to the motor 7 is prevented. In the embodiment shown the motor provided is an a-c motor. In this case the nonlinear resistor (diode 20) has to be provided such that the two half waves of the a-c voltage are used. For this purpose in the embodiment antiparallel circuits of the diodes 20 and of the voltage insulator separating the potentials (optoelectronic coupler 22) are chosen.

The operating current is transformed into a voltage nearly independent from the current size via the diodes 20, which voltage is fed to a voltage insulator such as the optoelectronic coupler 22 shown in the embodiment. The number of diodes 20 depends on the voltage size required for the control of the voltage insulator. The voltage insulator is necessary in case the motor 7 is driven by a higher voltage compared with the logic elements on the secondary side. The resistor 21 serves as an overload protection. At the same time the resistor 21 generates the necessary bias voltage for the optoelectronic coupler 22.

The output voltage of the voltage insulator is amplified in the amplifier of the amplifier unit 24 also containing a connected Schmitt-trigger and a time function element and the resulting signal is employed as a shut-off signal via an AND-gate.

The capacitor 23 connected in parallel to the optoelectronic coupler effects that turn on and shut off currents are not amplified.

The circuit for the reversal of the direction of rotation 9 of the motor 7 effects by way of the information about the actual direction of rotation and the information of the comparison circuit 13 relating to the difference of the preset and the actual setting a reversal of the direction of rotation of the motor 7 via known protective motor switches depending on the type of motor employed in each case.

It will be understood that each of the elements described above, or two or more together, may also find a useful application in other types of system configurations and control procedures differing from the types described above.

While the invention has been illustrated and described as embodied in the context of a control provision for final control elements as for example employed in printing machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Control provision for final control elements of a printing machine wherein a rotatable final control element is driven by a motor, comprising a pulse generating disk attached to the final control element of the printing machine and axially centered therewith, said disk having recesses regularly spaced from the axis; sensing means having two sensing points disposed at a radial distance from the axis suitable for engaging the recesses of the disk, said sensing means sensing the position of the recesses at said two sensing points; a recognition circuit connected to said sensing means and processing signals coming from said sensing means for recognizing the rotary direction of the final control element; an electronic counter connected to said recognition circuit and counting signals provided by said sensing means; a comparison circuit connected to the electronic counter; a set value provision connected to said comparison circuit and providing preset setting values, said comparison circuit comparing the results of counting with values provided by said set value provision to obtain a deviation signal; a device for reversal of a direction of rotation of the motor connected to said comparison circuit and to said recognition circuit and providing for reversal of direction of rotation of the motor upon appropriate deviation signal; gate means connected to the set value provision and to said device for reversal and providing a gate signal; and a motor control circuit connected to the motor and to the gate means and operative for controlling the final control element by employing the gate signal.

2. The control provision according to claim 1 further comprising an optical display connected to the electronic counter.

3. The control provision according to claim 1 wherein the motor control circuit comprises an amplifier connected to the gate means and to the motor; motor control electronic connected to the amplifier; and a power source connected to the motor and to the motor control electronic.

4. The control provision according to claim 3 wherein the amplifier comprises a relay.

5. The control provision according to claim 1 wherein the set value provision is provided by a punched tape reader.

6. The control provision according to claim 1 wherein the set value provision is provided by a manually controlled device.

7. The control provision according to claim 1 wherein the set value provision is provided by an electronically controlled device.

8. The control provision according to claim 1 wherein the disk with is formed such that the recesses have equal radial distance and where the distance between neighboring recesses is about the same in each case.

9. The control provision according to claim 1 wherein the sensing means comprises at each sensing point a photodiode and a light emitting diode.

10. The control provision according to claim 1 wherein the gate means comprises a bistable multivibrator.

11. The control provision according to claim 1 further comprising an optical display connected to the electronic counter and featuring light emitting diodes.

12. The control provision according to claim 1 wherein the motor control circuit comprises:

a power source connected in series with the motor;

a relay connected in series to the motor and to the power source;

antiparallel connected nonlinear resistors connected in series to the motor, the power source and the relay and closing a circuit;

antiparallel connected optoelectronic couplers connected to the antiparallel connected nonlinear resistors;

an amplifier connected to the antiparallel connected couplers;

a Schmitt-trigger connected to the amplifier; and a time function element connected to the Schmitt-trigger and to the gate means.

13. The control provision according to claim 12 wherein the nonlinear resistors include diodes.

* * * * *